US012394400B2

(12) United States Patent
Bosch Vicente

(10) Patent No.: US 12,394,400 B2
(45) Date of Patent: Aug. 19, 2025

(54) RELATIONS BETWEEN MUSIC ITEMS

(71) Applicant: Spotify AB, Stockholm (SE)

(72) Inventor: Juan José Bosch Vicente, Paris (FR)

(73) Assignee: Spotify AB, Stockholm (SE)

( * ) Notice: Subject to any disclaimer, the term of this patent is extended or adjusted under 35 U.S.C. 154(b) by 665 days.

(21) Appl. No.: 17/671,099

(22) Filed: Feb. 14, 2022

(65) Prior Publication Data

US 2023/0260492 A1    Aug. 17, 2023

(51) Int. Cl.
| | | |
|---|---|---|
| *G10H 7/00* | (2006.01) | |
| *G06F 16/632* | (2019.01) | |
| *G06F 16/65* | (2019.01) | |
| *G06N 3/045* | (2023.01) | |
| *G10G 1/00* | (2006.01) | |

(52) U.S. Cl.
CPC ............. *G10H 7/00* (2013.01); *G06F 16/634* (2019.01); *G06F 16/65* (2019.01); *G06N 3/045* (2023.01); *G10G 1/00* (2013.01)

(58) Field of Classification Search
CPC ............... G10H 1/0025; G10H 1/0066; G10H 2250/311; G10H 7/00; G06F 16/634; G06F 16/65; G06N 3/045; G10G 1/00
See application file for complete search history.

(56) References Cited

U.S. PATENT DOCUMENTS

| | | |
|---|---|---|
| 7,024,424 B1 | 4/2006 | Platt |
| 7,812,241 B2 | 10/2010 | Ellis |
| 8,073,854 B2 | 12/2011 | Whitman |
| 10,303,771 B1 | 5/2019 | Jezewski |
| 10,671,666 B2 | 6/2020 | Jin |
| 10,997,986 B2 | 5/2021 | Vincente |
| 11,238,839 B2 | 2/2022 | Pachet |

(Continued)

FOREIGN PATENT DOCUMENTS

| | | |
|---|---|---|
| EP | 751471 | 6/1996 |
| EP | 3796306 | 3/2021 |

(Continued)

OTHER PUBLICATIONS

Aucouturier; J.-J., Pachet, F and Sandler, M. "The Way It Sounds : Timbre Models for Analysis and Retrieval of Polyphonic Music Signals." IEEE Transactions of Multimedia, 7(6):1028-1035 (Dec. 2005).

(Continued)

*Primary Examiner* — Dedei K Hammond
*Assistant Examiner* — Philip G Scoles

(57) ABSTRACT

A method of determining relations between music items, the method comprising determining a first input representation for a symbolic representation of a first music item, mapping the first input representation onto to one or more subspaces derived from a vector space using a first model, wherein each subspace models a characteristic of the music items, determining a second input representation for music data representing a second music item, mapping the second input representation onto the one or more subspaces using a second model, determining a distance between the mappings of the first and second input representation in each subspace, wherein the distance represents the degree of relation between the first and second input representation with respect to the characteristic modelled by the subspace.

20 Claims, 9 Drawing Sheets

(56) References Cited

U.S. PATENT DOCUMENTS

| | | | |
|---|---|---|---|
| 2004/0093202 A1 | 5/2004 | Fischer | |
| 2004/0215447 A1 | 10/2004 | Sundareson | |
| 2005/0247185 A1* | 11/2005 | Uhle | G10H 1/40 84/616 |
| 2008/0021851 A1 | 1/2008 | Alcalde | |
| 2008/0288255 A1 | 11/2008 | Carin | |
| 2009/0044689 A1 | 2/2009 | Komori | |
| 2009/0049082 A1 | 2/2009 | Slaney | |
| 2010/0199833 A1 | 8/2010 | McNaboe | |
| 2011/0004642 A1 | 1/2011 | Schnitzer | |
| 2012/0237041 A1 | 9/2012 | Pohle | |
| 2012/0300950 A1 | 11/2012 | Usui | |
| 2013/0226957 A1 | 8/2013 | Ellis | |
| 2015/0242750 A1 | 8/2015 | Anderson | |
| 2017/0116533 A1 | 4/2017 | Jehan | |
| 2017/0154216 A1 | 6/2017 | Kennedy | |
| 2017/0236504 A1 | 8/2017 | Brooker | |
| 2018/0137845 A1 | 5/2018 | Prokop | |
| 2018/0341704 A1 | 11/2018 | Barkan | |
| 2019/0318060 A1 | 10/2019 | Brenner | |
| 2020/0074982 A1 | 3/2020 | McCallum | |
| 2020/0320388 A1 | 10/2020 | Lyske | |
| 2021/0049989 A1* | 2/2021 | Bretan | G06N 3/088 |
| 2021/0090536 A1 | 3/2021 | Pachet | |
| 2021/0090590 A1 | 3/2021 | Vincente | |
| 2021/0294840 A1* | 9/2021 | Lee | G06N 3/084 |
| 2021/0312941 A1 | 10/2021 | Vincente | |
| 2023/0223037 A1 | 7/2023 | Vicente | |
| 2023/0260488 A1 | 8/2023 | Vicente | |

FOREIGN PATENT DOCUMENTS

| | | |
|---|---|---|
| WO | 2015/035492 | 3/2015 |
| WO | 2015/154159 | 10/2015 |
| WO | 2016/189307 | 12/2016 |
| WO | 2017/030661 | 2/2017 |
| WO | 2019/084419 | 5/2019 |

OTHER PUBLICATIONS

Ellis, Daniel et al., "Identifying 'Cover Songs' with Chroma Features and Dynamic Programming Beat Tracking", 2007, 4 pages.
European Communication in Application 20174092.5, mailed Dec. 18, 2020, 8 pages.
European Communication in Application 20174092.5, mailed Aug. 23, 2021, 9 pages.
European Communication in Application 20174093.3, mailed Jun. 2, 2021, 13 pages.
European Communication in Application 20174093.3, mailed Dec. 3, 2020, 11 pages.
European Communication in Application 20205650.3, mailed Feb. 14, 2022, 7 pages.
European Extended Search Report in Application 20174092.5, mailed Sep. 1, 2020, 8 pages.
European Extended Search Report in Application 20174093.3, mailed Sep. 1, 2020, 12 pages.
European Extended Search Report in Application 20205650.3, mailed May 7, 2021, 16 pages.
European Extended Search Report in Application 20205651.1, mailed May 3, 2021, 13 pages.
European Minutes of the Oral Proceedings in Application 20174093.3, mailed Nov. 3, 2021, 13 pages.
European Result of Consulation in Application 20174093.3, mailed Oct. 20, 2021, 5 pages.
European Result of Consultation in Application 20174092.5, mailed Jan. 24, 2022, 3 pgs.
European Result of Consultation in Application 20174092.5, mailed Dec. 16, 2021, 7 pgs.
European Written Submission in Preparation to Oral Proceedings in Application 20174093.3, mailed Oct. 8, 2021, 5 pages.
Jehan, T. "Creating music by listening," PhD, MIT Media Lab (2005), 7 pages.
Lee, Jongpil, et al., "Disentangled Multidimensional Metric Learning for Music Similarity", ARXIV.org, Aug. 9, 2020, 5 pages.
Marco A. Martinez Ramirez, et al., "Deep Learning and Intelligent Audio Mixing." Proceedings of the 3rd Workshop on Intelligent Music Production, Salford, UK (Sep. 15, 2017), 4 pages.
Marolt, M., "A Mid-Level Representation for Melody-Based Retrieval in Audio Collections", IEEE Transactions on Multimedia, vol. 10, No. 8, Dec. 1, 2008, 9 pages.
Meinard Muller et al., "Multimodal Music Processing," DFU, vol. 3 (2012). Available at: https://drops.dagstuhl.de/opus/volltexte/dfu-complete/dfu-vo13-complete.pdf, 258 pages.
Oderkerken, Daphne, et al., "Decibel: Improving Audio Chord Estimation for Popular Music by Alignment and Integration of Crowd-Sourced Symbolic Representations", ARXIV.org, Feb. 22, 2020, 81 pages.
Van den Oord, Aaron, et al., "Deep content-based music recommendation." Advances in neural information processing systems (2013), 9 pages.
Veit, Andreas, et al., "Conditional Similarity Networks", 2017 IEEE Conference on Computer Vision and Pattern Recognition (CVPR), Jul. 21, 2017,9 pages.
European Communication in Application 20205651.1, mailed Jan. 10, 2024, 5 pages.

* cited by examiner

RELATIONS BETWEEN MUSIC ITEMS

TECHNICAL FIELD

Example aspects described herein generally relate to determining relations between music items, and more particularly to determining relations between music items using the concept of conditional similarity networks.

BACKGROUND

In digital music, songs are often made up of an assembly of various pre-existing and/or new tracks. A track is a representation of an individual element of an audio production that can be mixed with other tracks downstream as one unit. For instance, a track may consist of an individual instrument, such as guitar, piano, drums, a number of instruments, such a string section, or a vocal source such as lead vocals or backing vocals. Tracks may be assembled into submixes or subgroups. For instance, a submix may consist of a full orchestra, the percussion instruments, or any other grouping of sources. Tracks or submixes prepared in this fashion may be blended together to form a song. The arrangement of the tracks and the tracks themselves can be modified using various manipulation tools such as mixers. Track-mixers, for example, are used to mix material based on creating groups of tracks and processing them separately prior to combining them into a final master mix.

Tracks can be stored, for example in a database. Such a track database can be built by collecting songs made from an initial database of tracks that keeps growing. It can also be built or populated by source separation on existing songs (e.g., a catalogue of songs from a media distribution service). Tracks can be in different formats. Tracks may be divided into two principal domains: audio file formats (e.g., wav, .flac, .mp3) and symbolic file formats (e.g. MIDI, MusicXML, a list of events, or piano-roll). Audio files may be in the audio coding format and can be uncompressed, or compressed to reduce the file size, often using lossy compression. Symbolic files contain instructions about notes and when they are played, which can be interpreted by a virtual instrument, for example a synthesizer or sampler, to produce an audio output.

One technical problem that arises relates to determining which tracks in the tracks database are related to each other. This problem becomes more apparent as the track database grows, as users cannot listen to all the tracks in the database to determine which tracks are related. Solutions currently offered to creators include extending the use of conditional similarity networks (CSNs) that estimate the degree of similarity between images based on characteristics of the images ("Conditional Similarity Networks", Andreas Veit et al; Proceedings of the IEEE Conference on Computer Vision and Pattern Recognition, 2017, pp. 830-838). This technique can be applied to audio files of entire songs ("Disentangled Multidimensional Metric Learning for Music Similarity", Jongpil Lee et al, 2020 IEEE International Conference on Acoustics, Speech and Signal Processing). However, these methods are only applied to full mixes and only for audio files. There is therefore a desire to extend the application of these methods Accordingly, given a database of content including both audio and symbolic tracks and/or submixes, a user may wish to find which content is related.

SUMMARY

The methods of this disclosure attempt to solve the problems noted above by using CSN techniques to find relations between different sorts of music file. The methods extend currently known techniques in order to find relations between music files having different formats (for example relating audio files to symbolic files), and between music files that are only elements of full musical compositions (for example relating individual instrumental/vocal tracks, combinations of tracks/submixes). These approaches are enabled by using machine-learning to train models that can be used to relate the music files in different ways.

The methods of this disclosure provide a number of advantages. Tracks and submixes can be related to each other, rather than simply whole songs as in existing techniques, meaning a more diverse range of music files can be related to each other. Furthermore, music files can be related in a cross-domain fashion (e.g. audio files can be related to MIDI files), which was previously not possible. The use of CSN techniques allows music files to be related in many different ways (e.g., are they similar, are they the same mood), including based on characteristics beyond mere similarity (e.g., are they complementary, can they follow each other, etc.). The disclosed techniques can be applied to music files of different lengths, from small temporal segments of music, for example individual bars, to full-length music files.

According to a first aspect, there is provided a method of determining relations between music items, wherein a music item is a submix of a musical composition comprising one or more music tracks, the method comprising determining a first input representation for at least part of a first music item, mapping the first input representation onto to one or more subspaces derived from a vector space using a first model, wherein each subspace models a characteristic of the music items, determining a second input representation for at least part of a second music item, mapping the second input representation onto the one or more subspaces using a second model, and determining a distance between the mappings of the first and second input representations in each subspace, wherein the distance represents the degree of relation between the first and second input representations with respect to the characteristic modelled by the subspace.

Optionally, the first model and the second model each comprise a respective encoder and set of one or more mapping functions, wherein the encoder is configured to map the respective input representation into the vector space, and the set of mapping functions is configured to map the respective input representation from the vector space onto the one or more subspaces. Optionally, each encoder comprises a neural network. Optionally, each mapping function in the set of mapping functions is configured to map the input representation from the vector space onto a respective subspace of the one or more subspaces. Optionally, each mapping function comprises a neural network.

Optionally, the first and second music items are audio representations of music. Optionally, the first and second music items are symbolic representations of music, for example MIDI, MusicXML, a list of events or piano-roll. Optionally, the first and second models are the same. Optionally, the first and second models are different. Optionally, the first music item is an audio representation of music, the second music item is a symbolic representation of music, and the first and second models are different.

Optionally, the relations between the music items include one or more of complementarity, consecutiveness, mood similarity, sound similarity, genre similarity, rhythm similarity, instrument similarity, preset similarity, same composition, same track and/or same category. Optionally, a music track represents an instrumental or vocal part of a musical composition. Optionally, each part of a music item is a temporal portion of the music item, such as a bar. Optionally, a smaller distance between the mappings of the first and second input representations in a given subspace represents a higher degree of relation between the first and second input representations with respect to the characteristic modelled by the subspace.

According to a second aspect, there is provided a computer-readable medium having instructions stored thereon that, when executed by a computing device, cause the computing device to perform the method of the first aspect.

According to a third aspect, there is provided a method of determining relations between music items, the method comprising determining a first input representation for a symbolic representation of a first music item, mapping the first input representation onto to one or more subspaces derived from a vector space using a first model, wherein each subspace models a characteristic of the music items, determining a second input representation for music data representing a second music item, mapping the second input representation onto the one or more subspaces using a second model, determining a distance between the mappings of the first and second input representation in each subspace, wherein the distance represents the degree of relation between the first and second input representation with respect to the characteristic modelled by the subspace.

Optionally, the first model and the second model each comprise a respective encoder and set of one or more mapping functions, wherein the encoder is configured to map the respective input representation into the vector space, and the set of mapping functions is configured to map the respective input representation from the vector space onto the one or more subspaces. Optionally, each encoder comprises a neural network. Optionally, each mapping function in the set of mapping functions is configured to map the input representation from the vector space onto a respective subspace of the one or more subspaces. Optionally, each mapping function comprises a neural network.

Optionally, the music data is an audio representation of the second music item. Optionally, the music data is a symbolic representation of the second music item. Optionally, the first and second models are different. Optionally, the first and second models are the same.

Optionally, the relations between the music items include one or more of complementarity, consecutiveness, mood similarity, sound similarity, genre similarity, rhythm similarity, instrument similarity, preset similarity, same composition, same track and/or same category. Optionally, a symbolic representation of a music item is a MIDI, MusicXML, a list of events or piano-roll representation. Optionally, a smaller distance between the mappings of the first and second input representations in a given subspace represents a higher degree of relation between the first and second input representations with respect to the characteristic modelled by the subspace.

Optionally, a music item is at least part of a musical composition. Optionally, a music item is at least part of a music track or a submix comprising a number of music tracks. Optionally, a music track represents an instrumental or vocal part of a musical composition. Optionally, each part of a music item is a temporal portion of the music item, such as a bar.

According to a third aspect, there is provided a computer-readable medium having instructions stored thereon that, when executed by a computing device, cause the computing device to perform the method of the third aspect.

The disclosed methods extend currently known techniques in order to determine cross-domain relations between music files (those having different formats), and determine relations between individual tracks and/or submixes. These approaches enable a more diverse range of music files to be related to each other in many different ways. This can be applied to music files of different lengths, from individual bars to full-length music files.

BRIEF DESCRIPTION OF THE DRAWINGS

Exemplary embodiments of the disclosure shall now be described with reference to the drawings in which.

Throughout the description and the drawings, like reference numerals refer to like parts.

DETAILED DESCRIPTION

Figure 1:
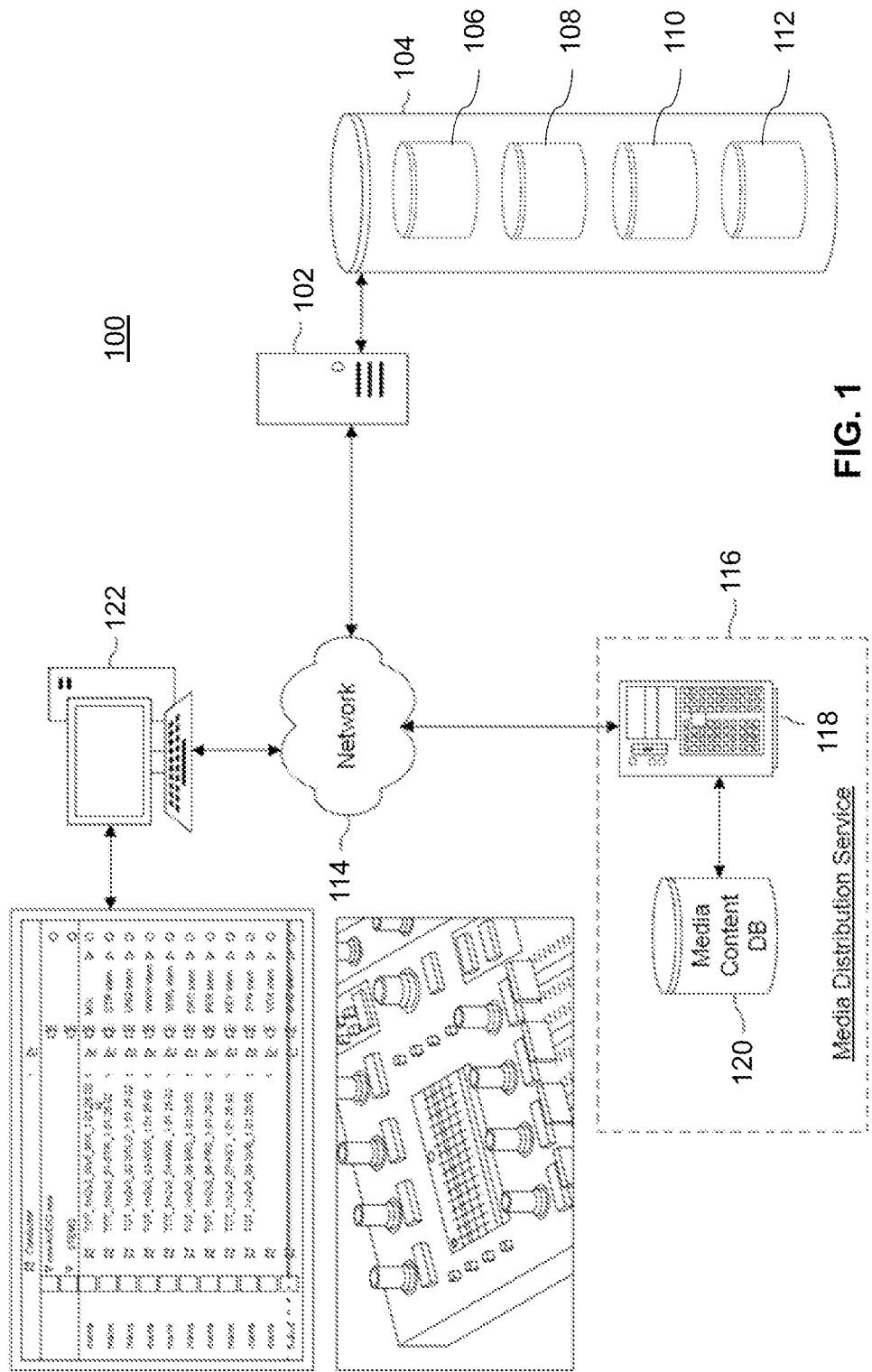
FIG. 1 illustrates a system for relating music items in accordance with an embodiment of the disclosure.

The example embodiments presented herein are directed to methods, systems and computer program products for determining relations between music items. This description is not intended to limit the application of the example embodiments presented herein. In fact, after reading the following description, it will be apparent to one skilled in the relevant art(s) how to implement the following example embodiments in alternative embodiments (e.g., as a dedicated hardware device, in other domains such as video and multimedia podcasts).

In the following, a music item is an item of music content, which may be stored in any format suitable for storing music content. Non-limiting examples of music items include tracks, audio stems, submixes, musical compositions or songs. A track is a representation of a discrete audio source that can be mixed with other tracks downstream as one unit to form a song. For instance, a track may consist of an individual instrument, such as guitar, piano, drums, or a vocal source such as lead vocals or backing vocals. A track can be stored in an audio file format (e.g., wav, .flac, .mp3, etc.) or a symbolic file format (e.g. MIDI, MusicXML, a list of events, piano-roll, etc.). Tracks stored in an audio file format can also be called audio stems.

Tracks may be assembled into submixes or subgroups. For instance, a submix may consist of all of the string instruments, a full orchestra, the percussion instruments, or any other grouping of audio sources. In the following, a submix is considered to comprise one or more tracks. Tracks or submixes prepared in this fashion may be mixed together to form a song (also referred to herein as a musical composition). It should be noted that the term "song" does not necessarily imply any vocal content, and a song could be any sort of musical composition, such as an instrumental musical composition, an a capella (vocal only) musical composition, or a musical composition comprising both instrumental and vocal components.

A media content item is an item of media content, including audio, video, or other types of media content, which may be stored in any format suitable for storing media content. Non-limiting examples of media content items include songs, music, albums, audiobooks, music videos, movies, television episodes, podcasts, other types of audio or video content, and portions or combinations thereof. Music items are one type of media content item.

In some embodiments, representations of music items are determined. The representations input to a model which maps them into a number of subspaces, each subspace describing a particular characteristic of the music items. In some embodiments, the model maps the representations into a multidimensional vector space using one or more encoders (for example a neural network), and then applies a set of mapping functions (for example neural networks, linear functions or masking functions) to map the representations into the number of subspaces. This can be achieved by training the encoders and the mapping functions using a machine-learning algorithm such that music items that are related based on a particular characteristic are closer in the corresponding subspace according to a given distance metric. In this way, related music items can be more easily identified.

In some of the disclosed methods, the representations of music items may be acoustic feature vectors. An acoustic feature vector describes acoustic and musical properties of a given recording. In some embodiments, an acoustic feature vector is created manually, by manually quantifying the amount of given properties, (e.g., vibrato, distortion, presence of vocoder, energy, valence, etc.). In other embodiments, the acoustic feature vector is created automatically (which is the case in the implementations described herein), for example using as input an amplitude of the signal, a time-frequency progression, or more complex features. An example of a more complex feature which is derived directly from the audio signal is an intermediate layer embedding of a neural network trained to predict latent factors used for media content item recommendation. It should be understood that other now-known or future methods for determining an acoustic feature to generate acoustic feature vectors can be used and still be within the scope of the present disclosure.

FIG. 1 illustrates a system 100 for relating music items in accordance with an embodiment of the disclosure. A relation processor 102 is communicatively coupled to one or more databases. In one example embodiment, the relation processor 102 is coupled to a music item database 104. In some embodiments, relation processor 102 includes at least one processor and a non-transitory memory storing instructions. When the instructions are executed by the processor(s), the processor(s) performs the functions described herein for relation of music items. The relation processor 102 may use one or more of the techniques described below to determine relations between music items in the music item database 104.

The music item database 104 is arranged to store a plurality of music items. The music item database 104 may comprise an audio track database 106, a symbolic track database 108, a submix database 110 and a song database 112. Audio tracks in the audio track database 106 may be stored in an encoded format (e.g., .wav, .mp3, .m4a, .ogg, .wma, etc.). Symbolic tracks in the symbolic track database 108 may be stored in symbolic formats such as MIDI, MusicXML, a list of events, piano-roll or other suitable formats. Submixes stored in the submix database 110 may each comprise a plurality of audio and/or symbolic tracks that are grouped together to form a submix.

One or more music items that are stored in the audio track database 106, symbolic track database 108, or submix database 110 can be retrieved and inserted into a song during a song creation process. In some embodiments, other music items are retrieved from other sources via a network 114 or a local source such as a memory store or a track creation application (not shown). The song database 112 may be employed to store songs produced using music items. In some embodiments, the song database 112 is built progressively by collecting songs that are produced using the music items stored in the music items database 104. Songs retrieved from other sources may also be stored in the song database 112.

In some embodiments, a music item use record can also be maintained. In some embodiments, a music item use record is maintained in a database such as the music item database 104. The use record of each music item is used to maintain a record of which music items have been retrieved from music item database 104 to create a song that is stored in the song database 112. Thus, for each of the songs in the song database 112, which music items have been used is known.

In some embodiments, relation processor 102 is communicatively coupled to a media distribution service 116 that includes a music distribution server 118 arranged to distribute media content items and a media content database 120 that stores media content items. The media distribution service 116 can provide streams of media content or media content items for downloading to relation processor 102.

Thus, music item database 104 can be built or populated in different ways. In one embodiment, relation processor 102 performs source separation on received songs to separate the individual music items that, when mixed, form the song. In some embodiments, the music items including their respective attributes are encoded and stored in music item database 104 for later processing.

In an example implementation, the relation processor 102 receives a query, such as a track, or a partially composed song in the form of a set of tracks or submixes to be mixed by a client device executing an audio editor application 122 (referred to simply as audio editor 122). In some examples, the partially composed song is in the form of a composition expressed in a music score or other symbolic format.

One technical challenge involves identifying a music item to a user during the production process based on music items already selected for a song being produced. This may involve finding relations between music items stored in the music item database 104, which is non-trivial when the music items are of various different types or domains (e.g., audio tracks, symbolic tracks, submixes). These technical problems become more challenging as the music item database 104 grows, as users cannot listen to all the music items to make their choice. Consequently, identifying a music item for combining with existing music items becomes a significant technical challenge.

Methods are known to those in the art that can be used to determine similarity between music items by training neural networks to map the items into a feature-vector space. The mapping minimises the distance between similar items in the feature vector space, such that smaller distances are indicative of increased similarity between items. However, these methods only determine a single, general measure of similarity between input music items. This is because different measures of similarity cannot be mapped into a single feature-vector space. The use of conditional similarity networks (CSNs) goes some way to resolving this issue. CSNs enable input music items to be mapped into a plurality of different vector subspaces that describe different characteristics of the music items. This enables music items to be related in a number of different ways.

The characteristics that can be modelled by such CSNs include complementarity, consecutiveness, mood similarity, sound similarity, genre similarity, rhythm similarity, instrument similarity, preset similarity, composition, track and/or category. Complementarity describes whether two music items complement each other, i.e., would they sound good when played alongside each other in a song. For example, a certain guitar sound may sound better with one drum track than another drum track. "Consecutiveness" describes whether two music items would sound good when one is played after the other in a song. "Mood similarity" describes whether two music items are of a similar mood, for example, happy, sad, chilled, energetic, etc. "Sound similarity" describes whether two music items have similar sonic characteristics, e.g. "warm", "organic", "metallic", "dry", "distorted", etc. "Genre" similarity describes whether two music items are of the same genre, for example jazz, rock, folk, pop, etc. "Rhythm similarity" describes whether two music items have similar rhythmic properties, such as the kind of rhythm (e.g. samba, waltz, chachacha), sloppiness, groove, etc. "Instrument similarity" describes whether two music items contain similar instrumental sounds, for example, guitar, bass, drums etc. Instrument types can be tagged manually by the users who uploaded the sounds, or automatically (e.g., using an instrument classifier trained on music items). "Instrument similarity" can also describe information about musical scores, for example if a given piece of two different scores is likely to be played by the same instrument(s). "Preset similarity" describes whether two music items share similar combinations of effects (e.g., EQ settings, compression, gain, reverb, etc.) and may include an identification of a virtual instrument that produces audio from a symbolic representation. This may be related to instrument similarity. "Composition" describes whether two music items are derived from the same musical composition. "Track" describes whether two music items are derived from the same track, for example are different temporal portions of the same track. "Category" describes whether two music items share one or more categories that may be tagged by a user, for example danceability, expressivity, producer, composer or other categories that a user may be interested in.

Figure 2:
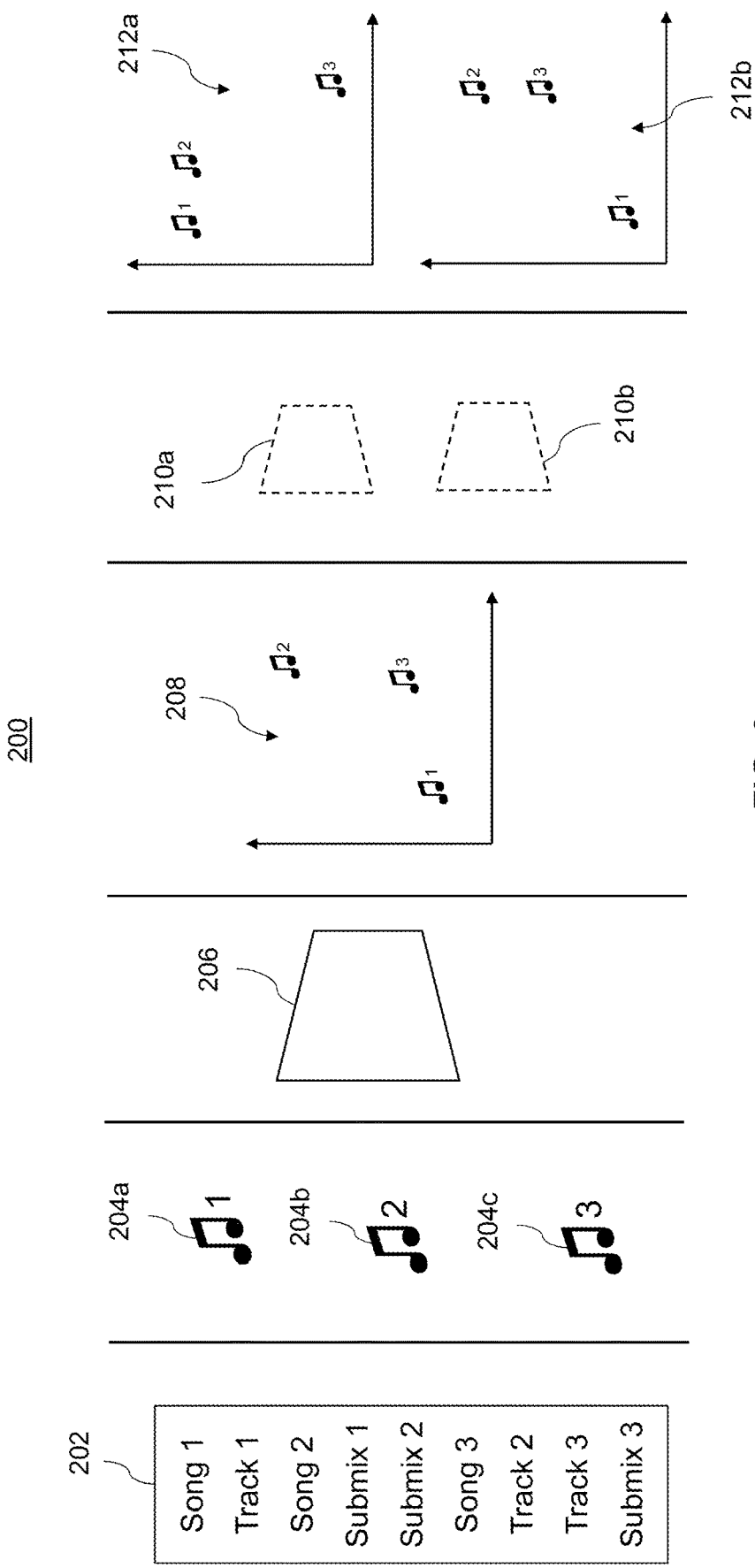
FIG. 2 illustrates an example model for relating music items across a number of characteristics.

FIG. 2 shows an example model 200 for relating music items across a number of characteristics using CSN techniques. The model 200 may be implemented by the relation processor 102 shown in FIG. 1. As described herein, a "model" maps representations of music items into a number of different subspaces. A model may comprise an encoder and a number of mapping functions that map the representations into the subspaces. As used herein, an "encoder" maps a representation into a vector space, and a "mapping function" maps the representation from the vector space into a respective subspace. Different models can be trained for different types of input. For example, one model may be trained to map audio music items into the plurality of subspaces, and a different model may be trained to map symbolic music items into the plurality of subspaces.

In FIG. 2, a number of music items 202 are shown. The music items 202 may be stored in a database, for example the music item database 104. As discussed above, the music items 202 can be tracks, submixes, songs, or other types of music item. Only three types of music item 202 are shown in FIG. 2 for simplicity.

Representations 204 of the music items 202 are produced. For example, music items may be represented as acoustic feature vectors. In other embodiments, the music items could be represented in other suitable ways known in the art, for example as a waveform, matrices, tensors, or lists of events (e.g., a list of note onsets and offsets). A representation 204 may be produced for each music item 202 in the music item database 104. Only three representations 204a-c are shown in FIG. 2 for simplicity.

The representations 204 of the music items 202 are input into an encoder 206. The encoder 206 is used to map the music items into a vector space 208. In some embodiments, the encoder 206 comprises one or more neural networks. In other embodiments, the encoder 206 can be any other suitable type of encoder, such as a set of feature extractors that use digital signal processing techniques, or other data-driven machine learning techniques.

In order to determine the similarity of music items according to different characteristics, a set of mapping functions 210 is used to map the representations in the vector space 208 into a one or more subspaces 212. Each mapping function 210 and corresponding subspace 212 corresponds to a certain characteristic of the music items. The mapping functions 210 are trained such that, in each subspace 212, the distance between music items that are related according to the relevant characteristic is smaller than the distance between music items that are less related according to that characteristic. In some embodiments, the mapping functions 210 comprise one or more neural networks. In other embodiments, the mapping functions 210 can take other forms, for example a linear combination function or a masking function.

As shown in the example of FIG. 2, music items represented by ♫ $^1$ and ♫ $^2$ are close to each other in a first (top) subspace 212a, and further from the music item represented by ♫ $^3$. If the characteristic described by the first subspace 212a was genre, this could indicate that music items represented by ♫ $^1$ and ♫ $^2$ are jazz items, whereas the music item represented by ♫ $^3$ is a hip-hop item. In a second (bottom) subspace 212b, music items represented by ♫ $^2$ and ♫ $^3$ are close to each other, but further from to the music item represented by ♫ $^1$. If the characteristic described by the second subspace 212b was instrument, this could indicate that music items represented by ♫ $^2$ and ♫ $^3$ are likely to be played by the same instrument, for example a guitar, whereas the music item represented by ♫ $^1$ is likely to be played by a different instrument, for example a piano. Whilst two mapping functions 210a-b and corresponding subspaces 212a-b are shown in FIG. 2 for simplicity, it will be appreciated that any suitable number of mapping functions 210 and subspaces 212 could be implemented based on the number of characteristics by which the music items are to be related. As each characteristic is differently modelled, the subspaces 212 can be described as being disentangled. It will be understood by those skilled in the art that FIG. 2 depicts a 2D representation of the multidimensional spaces for illustrative purposes only.

Using these techniques, music items can be related based upon a number of different characteristics to identify similar items based on the particular characteristics (e.g., items that have similar tempos, are the same genre, are consecutive in a song, etc.). A query music item (e.g., an audio track of a guitar) can then be provided for finding a related music item (e.g. a compatible vocal track) from the music item database 104 based on one or more characteristics of interest, as will be discussed in relation to FIGS. 7 and 8. For example, given a musical composition that contains all instruments except a guitar, models such as the model 200 can be used to find a guitar item that has the same tempo, mood, and/or genre. In some embodiments, such models can also be used to find a related item for a single input stem (e.g. vocals, guitars, etc.).

Figure 3:
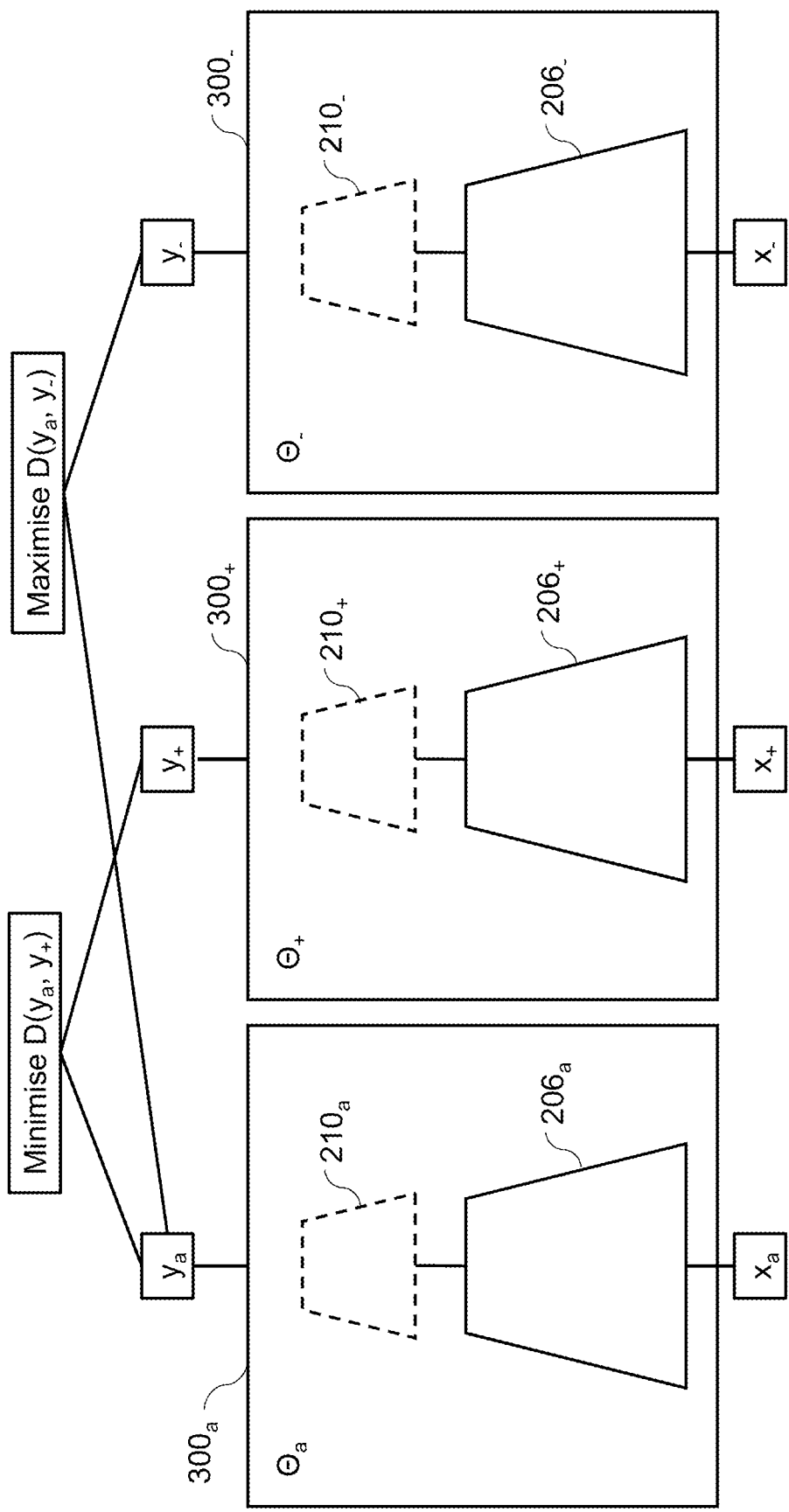
FIG. 3 depicts an architecture that is used to train a number of models, according to an embodiment of the disclosure.

The data in music item database 104 can be used to train the models. As discussed above, different models can be trained for different types of input. In some embodiments of the present disclosure, the encoder 206 and the mapping functions 210 for each model 200 are trained simultaneously. FIG. 3 depicts an architecture that is used to train the neural networks of a number of models, according to an embodiment of the present disclosure.

In the example of FIG. 3, the training is performed using input triplets. The inputs x (i.e., the representations 204 associated with the music items 202) are derived, in part, from items stored in music item database 104. Training the models involves three inputs: $x_a$ (an anchor), $x_+$ (a positive example) and $x_-$ (a negative example). The positive example $x_+$ corresponds to the representation of a music item that is related to the anchor item $x_a$. The negative example $x_-$ corresponds to the representation of a music item that is not related to the anchor item $x_a$.

Each input is applied to a respective model comprising an encoder and a mapping function. Specifically, input $x_a$ is applied to a first model 300a comprising a first encoder 206a and a first mapping function 210a. The first model 300a has a first set of parameters $\theta_a$. Input $x_+$ is applied to a second model $300_+$ comprising a second encoder $206_+$ and a second mapping function $210_+$. The second model $300_+$ has a second set of parameters $\theta_+$. Input $x_-$ is applied to a third model $300_-$ comprising a third encoder $206_-$ and a third mapping function $210_-$. The third model $300_-$ has a third set of parameters $\theta_-$. Each model is shown having a single mapping function 210 for simplicity, although each model may comprise one or more mapping functions 210, each corresponding to a different characteristic as discussed previously, which could also be trained simultaneously with the rest of the model by using inputs for different characteristics.

Each model provides a respective output y: $y_a$ (an anchor), $y_+$ (a positive example) and $y_-$ (a negative example). In this example, for a given characteristic, $y_a$ and $y_+$ should be close in the relevant subspace since they are related, and $y_a$ and $y_-$ should be far apart since they are not related. The parameters $\theta_a$, $\theta_+$, $\theta_-$ of each model $300_a$, $300_+$, $300_-$ are trained such that the distance between $y_a$ and $y_+$ is minimised in the resulting subspace, and the distance between $y_a$ and $y_-$ is maximised. It will be appreciated that according to a different characteristic, $y_a$ and $y_+$ may be further apart if they are less related than according to the first characteristic. If the type of the inputs is the same (for example, $x_a$, $x_+$ and $x_-$ are all audio items, all drum items, or are all tonal items), then the parameters $\theta_a$, $\theta_+$, $\theta_-$ could also be the same. This set of parameters can then be used when the model is used.

In some embodiments, the parameters θ of a model are learned using a loss function (L). A loss function or cost function is a function that maps an event or values of one or more variables onto a real number intuitively representing some "cost" associated with the event. An optimization problem seeks to minimize a loss function. In some example embodiments, parameters θ of the model are learned using backpropagation with mini-batch gradient descent, using a loss function computed according to the following equation:

$$L=\max(0, M+D(y_a, y_+)-D(y_a, y_-))$$

where D(x,y) represents a Euclidean distance between vectors x and y, and M, a margin value, for example, where M=0.3. It will be appreciated that other suitable loss functions could be used. For instance, a classification-based loss could be employed when training examples are associated with class labels (e.g. sad, happy or energetic for the mood relation, or pop, rock, jazz for the genre relation). Several losses could also be combined.

As discussed above, different models may be trained dependent on the domain of the input music items. That is to say, one model, comprising a first set of encoders 206 and mapping functions 210, may be trained to map audio music items into the one or more subspaces, and a different model, comprising a second set of encoders 206 and mapping functions 210, may be trained to map symbolic music items into the one or more subspaces. This is achieved by using different training data to train each particular model. For example, when training an audio model, the three input representations discussed above ($x_a$, $x_+$ and $x_-$) may each be derived from audio music items. Similarly, when training a symbolic model, the three input representations may each be derived from symbolic music items. When it is desired to find relations between music items, they are applied to the appropriate model. For example, if the first music item is an audio item, it is applied to a model that was trained based on audio training. If the first music item is a symbolic music item, it is applied to a model that was trained based on symbolic training data. As all models are trained to map music items into the same subspaces, music items can be related regardless of their domain. In some embodiments, different models may be trained within a single domain dependent on other factors, for example instrument type. For example, one model may be trained for relating symbolic drum items, and a different model may be trained for relating more tonal symbolic music items.

Whilst FIG. 3 shows that the encoders 206 and the mapping functions 210 for a given model are trained simultaneously, in some embodiments the individual encoders 206 could be pre-trained separately. This could be achieved using supervised or self-supervised learning, with annotations for a given task for each domain. The mapping functions 210 can then be trained in order to perform the function requires for a music relation task using transfer-learning (for example using feature extraction/encoding) using the trained encoders 206 as a basis.

Figure 4:
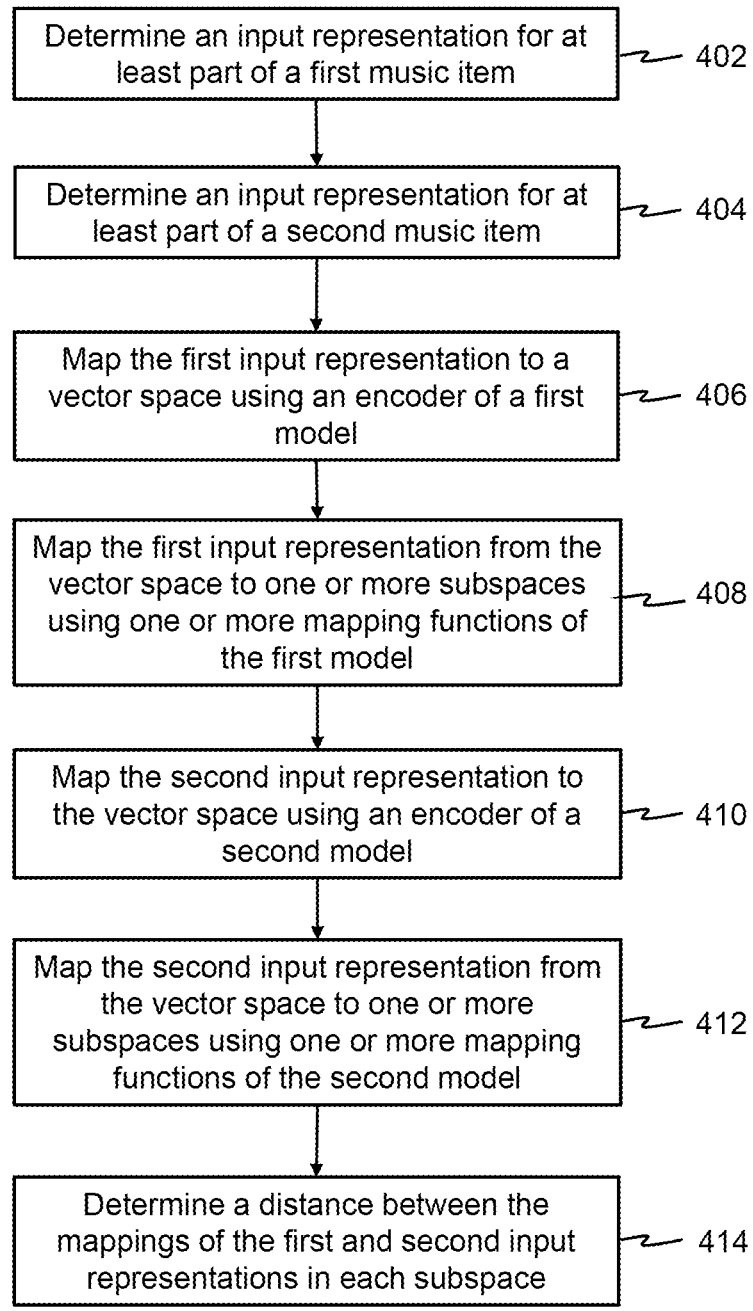
FIG. 4 illustrates a method of relating music items according to embodiments of the disclosure.
Figure 5:
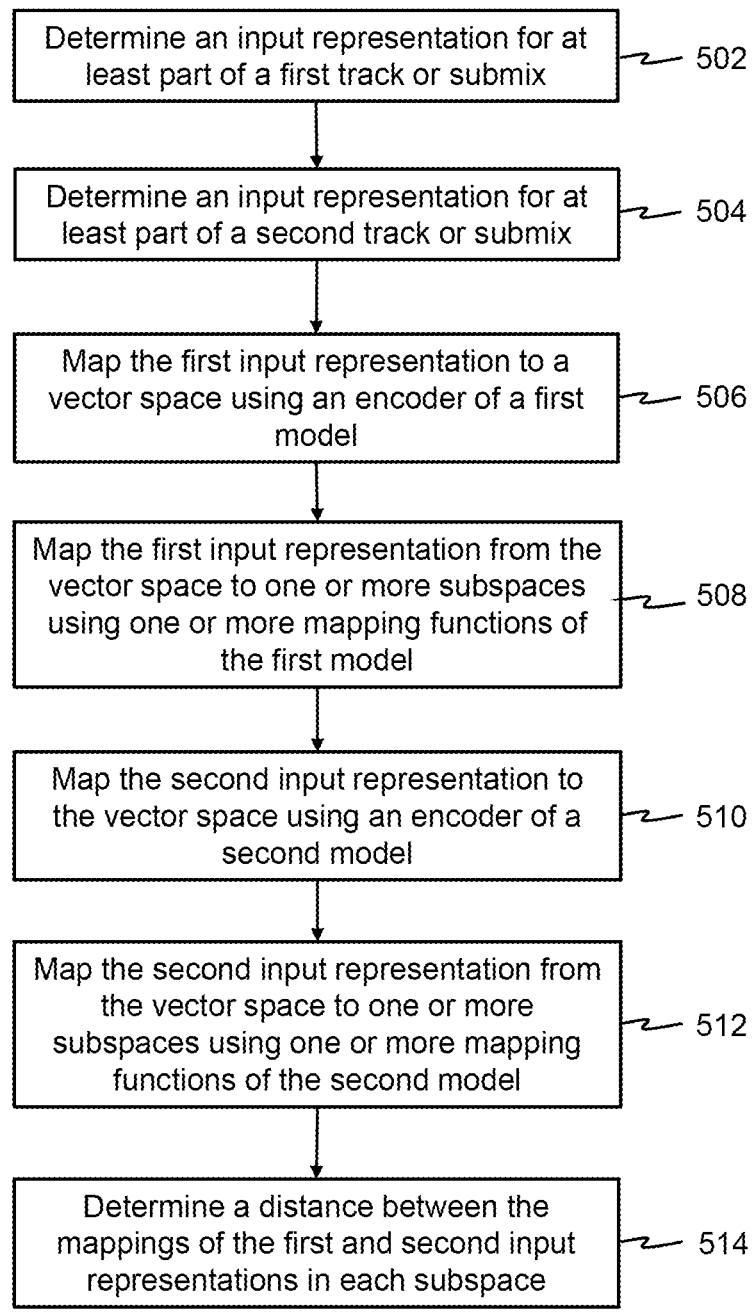
FIG. 5 illustrates a method of relating tracks or submixes according to embodiments of the disclosure.
Figure 6:
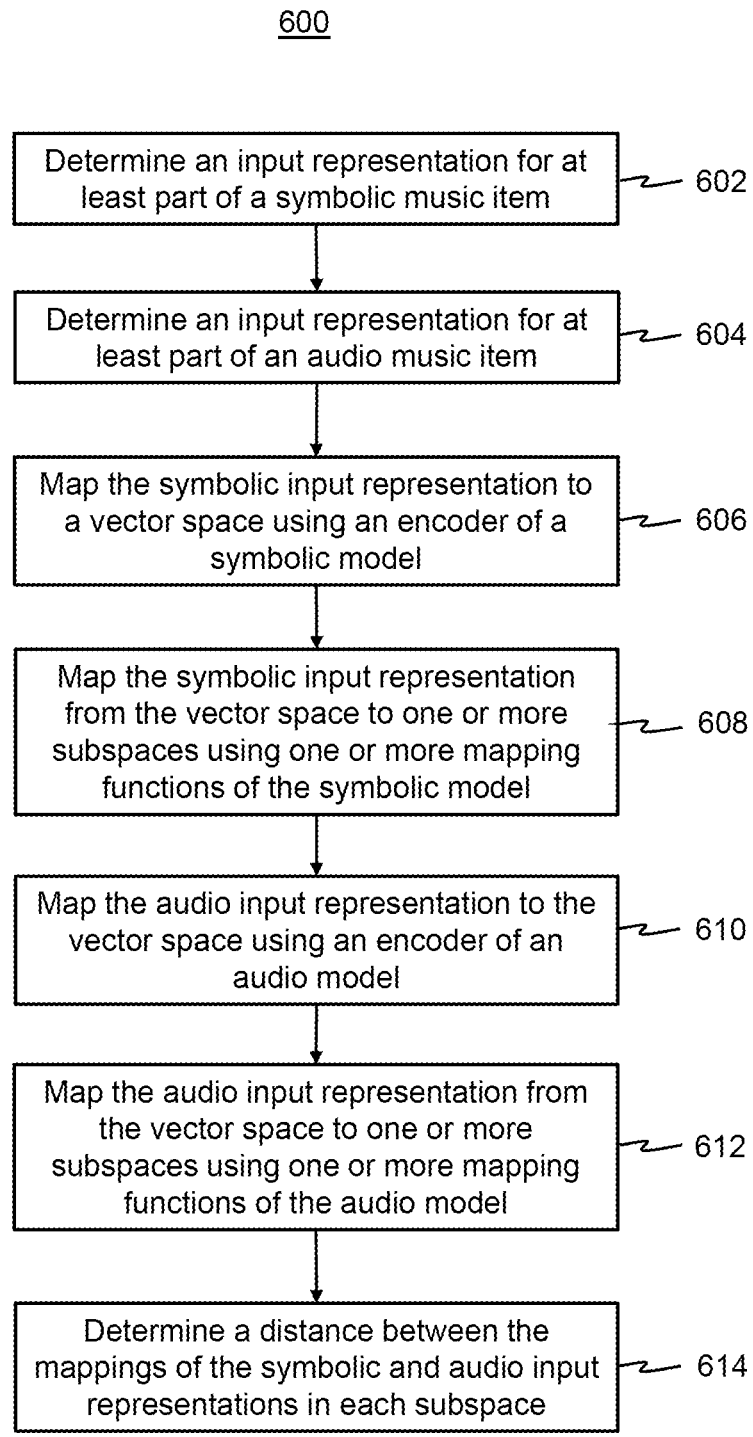
FIG. 6 illustrates a method of relating audio music items to symbolic music items according to embodiments of the disclosure.

Once the models have been trained, music items in the music item database 104 can be related to each other. FIGS. 4 to 6 illustrate methods of determining relations between music items. The methods use the models discussed above in relation to FIGS. 2 and 3, and differ in the way that the different models are applied.

FIG. 4 illustrates a method 400 of determining relations between music items. The music items in this method may be any type of music item discussed previously. For example, the music items may be at least part of a musical composition, for example a track, submix, or full song. A track may be an audio track stored in an audio file format (e.g., .wav, .flac, .mp3), or a symbolic track stored in a symbolic file format (e.g. MIDI, MusicXML, a list of events or piano-roll). The music items may also be submixes comprising a number of different tracks. The music items may be a temporal portion of a longer music item, such as a single bar of a full track or submix.

At step 402, an input representation is determined for at least part of a first music item. The input representation may be, for example, a waveform, a vector, a matrix, a tensor, a list of events, or an acoustic feature vector determined in any suitable manner as discussed above.

At step 404, an input representation is determined for at least part of a second music item. Similarly to the first music item, the input representation may be, for example, a waveform, a vector, a matrix, a tensor, a list of events, or an acoustic feature vector determined in any suitable manner.

At steps 406 and 408, the first input representation is input to a first model to map it into one or more subspaces, as will be described below.

At step 406, the input representation of the first music item is mapped to a vector space using an encoder of a first model. Depending on the domain of the first music item, a relevant model is selected. For example, if the first music item is an audio item, a model that was trained based on audio training data is used. If the first music item is a symbolic music item, a model that was trained based on symbolic training data is used. As discussed above, a particular model may be selected dependent on whether the first music item is a track or a submix, or a single mapping function may be applicable to all types of music item. In some embodiments, the first encoder is a neural network.

At step 408, one or more mapping functions of the first model are applied to the representation of the first music item. The mapping functions map the first representation from the vector space into one or more subspaces. Each mapping function in the set of mapping functions corresponds to a certain characteristic, such that each subspace models a relation between the first and second music items. The characteristics that can be modelled include complementarity, consecutiveness, mood similarity, sound similarity, genre similarity, rhythm similarity, instrument similarity, preset similarity, same composition, same track and/or same category.

At steps 410 and 412, the second input representation is input to a second model to map it into the one or more subspaces, as will be described below.

At step 410, the input representation of the second music item is mapped to the vector space using an encoder of a second model. As discussed above, a relevant model is selected based on the domain of the second music item, and a particular model may be selected dependent on whether the first music item is a track or a submix, or a single mapping function may be applicable to all types of music item. Similarly to the first encoder, the second encoder may be a neural network.

At step 412, one or more mapping functions of the second model are applied to the representation of the second music item. The mapping functions map the second representation from the vector space into the one or more subspaces.

The representations of the first and second music items are then mapped into each of the subspaces, and can be compared based on the respective characteristics. At step 414, a distance is determined between the mappings of the first and second input representations in each subspace. The distance may be a Euclidean distance. The distance represents the degree of relation between the first and second input representations with respect to the characteristic modelled by a particular subspace. In other words, the distance is correlated to the degree of relation. In some embodiments, a smaller distance between the mappings in a given subspace represents a higher degree of relation between the first and second music items with respect to the particular characteristic modelled by the subspace. It will be appreciated that the model may be trained such that other relationships between the distance and the degree of relation are possible.

If the first music item and second music item are both in the same domain (i.e., both audio, or both symbolic), then the first and second models can be the same (i.e., a single model can be used). If the first music item and second music item are in different domains (i.e., the first music item is an audio and the second music item is a symbolic item, or vice versa), then the first and second models can be different (i.e., an audio model can be used for the first music item and a symbolic model can be used for the second music item). In some embodiments where the first music item and second music item are both symbolic, the first and second models can be different, for example if the music items are of different instrument types. As discussed above, one model may be trained for drum items, and a different model may be trained for more tonal music items. The models are trained such that, regardless of the domain in which they operate, the representations of the music items are mapped into the same subspaces for a given characteristic so that they can be compared.

The method 400 provides a number of advantages. A database of music items can be related to each other based upon a number of different characteristics (e.g., are they similar, are they the same mood), including relations not related to mere similarity (e.g., are they complementary, can they follow each other, etc.). This allows music items that are related to a query music item to be identified for assembling a complete song. The characteristics that are deemed important for song composition can be selected and the most suitable music item can be identified. The method 400 can be applied to music files of different types, domains and lengths, including relating tracks, submixes, audio, symbolic, full-length music files and small temporal segments of music, for example individual bars.

FIGS. 5 and 6 illustrate specific examples of methods of determining relations between music items, based on method 400. The methods shown in FIGS. 5 and 6 illustrate how the techniques disclosed herein can extend the functionality of existing music relation methods. In particular, smaller elements of songs can be related, either temporally or in terms of breaking a song up into its constituent parts. Furthermore, the methods described herein make cross-domain relation of music items possible, something that has not been previously envisaged.

FIG. 5 shows a method 500 of determining relations between individual tracks or submixes. In this particular method, the music items are limited to individual tracks or submixes, rather than whole musical compositions.

At step 502, an input representation is determined for at least part of a first music item. In this case, the first music item is a track or submix, for example an audio track, a symbolic track, and audio submix or a symbolic submix. For simplicity, in the following, the first music item will be referred to as the first track. The input representation may be, for example, a matrix, a tensor, a list of events, or an acoustic feature vector determined in any suitable manner as discussed above.

At step 504, an input representation is determined for at least part of a second music item. Similarly to the first music item, the second music item is a track or submix, for example an audio track, a symbolic track, and audio submix or a symbolic submix. For simplicity, in the following, the second music item will be referred to as the second track.

Similarly to the first track, the input representation may be, for example, a matrix, a tensor, a list of events, or an acoustic feature vector determined in any suitable manner.

At steps 506 and 508, the first input representation is input to a first model to map it into one or more subspaces, as will be described below.

At step 506, the input representation of the first track is mapped to a vector space using an encoder of a first model. Depending on the domain of the first track, a relevant model is selected. For example, if the first track is an audio item, a model that was trained based on audio training data is used. If the first track is a symbolic item, a model that was trained based on symbolic training data is used. As discussed above, a particular model may be selected dependent on whether the first music item is a track or a submix, or a single mapping function may be applicable to all types of music item. In some embodiments, the first encoder is a neural network.

At step 508, one or more mapping functions of the first model are applied to the representation of the first track. The mapping functions map the first representation from the vector space into one or more subspaces. Each mapping function in the set of mapping functions corresponds to a certain characteristic, such that each subspace models a relation between the first and second music items. The characteristics that can be modelled include complementarity, consecutiveness, mood similarity, sound similarity, genre similarity, rhythm similarity, instrument similarity, preset similarity, same composition, same track and/or same category.

At steps 510 and 512, the second input representation is input to a second model to map it into the one or more subspaces, as will be described below.

At step 510, the input representation of the second track is mapped to the vector space using an encoder of a second model. As discussed above, a relevant model is selected based on the domain of the second track, and a particular model may be selected dependent on whether the second music item is a track or a submix, or a single mapping function may be applicable to all types of music item. Similarly to the first encoder, the second encoder may be a neural network.

At step 512, one or more mapping functions of the second model are applied to the representation of the second track. The mapping functions map the second representation from the vector space into the one or more subspaces.

The representations of the first and second music items are then mapped into each of the subspaces, and can be compared based on the respective characteristics. At step 514, a distance is determined between the mappings of the first and second input representations in each subspace. As discussed above, the distance may be a Euclidean distance. The distance represents the degree of relation between the first and second input representations with respect to the characteristic modelled by the subspace. In some embodiments, a smaller distance between the mappings in a given subspace represents a higher degree of relation between the first and second input representations with respect to the particular characteristic modelled by the subspace.

If the first track and second track are both in the same domain (i.e., both audio, or both symbolic), then the first and second models can be the same (i.e., a single model can be used). If the first track and second track are in different domains (i.e., the first track is an audio and the second track is a symbolic item, or vice versa), then the first and second models can be different (i.e., an audio model can be used for the first track and a symbolic model can be used for the second track). In embodiments where the first track and second track are both symbolic, the first and second models can be different if the tracks are of different instrument types, as discussed above. As discussed above, one model may be trained for drum items, and a different model may be trained for more tonal music items. The models are trained such that, regardless of the domain in which they operate, the representations of the tracks are mapped into the same subspaces for a given characteristic so that they can be compared.

The method 500 finds relations between tracks and submixes, rather than simply whole songs as in existing techniques. For example, tracks can be related to other tracks, submixes can be related to other submixes, and tracks and submixes can be related to each other. As tracks and submixes can be related to each other, a more diverse range of music files can be related to each other. A practical application of this is that a song can be built from only single track, with related tracks or submixes added as desired. Furthermore, tracks and submixes can be related in a cross-domain fashion (e.g. .wav files can be related to MIDI files), which was previously not possible, thus extending the functionality of music item identification process.

FIG. 6 shows a method 600 of determining relations between music items in a cross-domain manner. That is to say, the method 600 determines relations between audio format music items and symbolic format music items.

At step 602, an input representation is determined for at least part of a first music item. The first music item is a symbolic music item, for example a track, submix, or full song stored in a symbolic file format (e.g. MIDI, MusicXML, a list of events or piano-roll). The symbolic music item may be a temporal portion of a longer music item, such as a single bar of a full track or submix. The input representation may be, for example, a matrix, a tensor, a list of events, or an acoustic feature vector determined in any suitable manner as discussed above.

At step 604, an input representation is determined for at least part of a second music item. The second music item is an audio music item, for example a track, submix, or full song stored in an audio file format (e.g., .wav, .flac, .mp3). The audio music item may be a temporal portion of a longer music item, such as a single bar of a full track or submix. Similarly to the symbolic music item, the input representation may be, for example, a matrix, a tensor, a list of events, or an acoustic feature vector determined in any suitable manner.

At steps 606 and 608, the symbolic input representation is input to a first model to map it into one or more subspaces, as will be described below. The first model is trained based on symbolic training data.

At step 606, the input representation of the symbolic music item is mapped to a vector space using an encoder of the symbolic model. In some embodiments, the symbolic encoder is a neural network.

At step 608, one or more mapping functions of the symbolic model are applied to the representation of the symbolic music item. The mapping functions map the symbolic representation from the vector space into one or more subspaces. Each mapping function in the set of mapping functions corresponds to a certain characteristic, such that each subspace models a relation between the symbolic and audio music items. The characteristics that can be modelled include complementarity, consecutiveness, mood similarity, sound similarity, genre similarity, rhythm similarity, instrument similarity, preset similarity, same composition, same track and/or same category.

At steps 610 and 612, the audio input representation is input to a second model to map it into the one or more subspaces, as will be described below. The second model is trained based on audio training data.

At step 610, the input representation of the audio music item is mapped to the vector space using an encoder of an audio model. In some embodiments, the audio encoder is a neural network.

At step 612, one or more mapping functions of the audio model is applied to the representation of the audio music item. The mapping functions map the audio representation from the vector space into the one or more subspaces.

The representations of the symbolic and audio music items are then mapped into each of the subspaces, and can be compared based on the respective characteristics. At step 614, a distance is determined between the mappings of the symbolic and audio input representations in each subspace. The distance may be a Euclidean distance. The distance represents the degree of relation between the symbolic and audio input representations with respect to the characteristic modelled by the subspace. In some embodiments, a smaller distance between the mappings in a given subspace represents a higher degree of relation between the symbolic and audio input representations with respect to the particular characteristic modelled by the subspace.

The method 600 finds relations between audio music items and symbolic music items. As audio and symbolic files can be related to each other, rather than simply single domain relations as in existing techniques, a more diverse range of music files can be related to each other. Music items can be related in a cross-domain fashion (e.g. .wav files can be related to MIDI files), which was previously not possible, thus extending the functionality of music item identification process.

Figure 7:
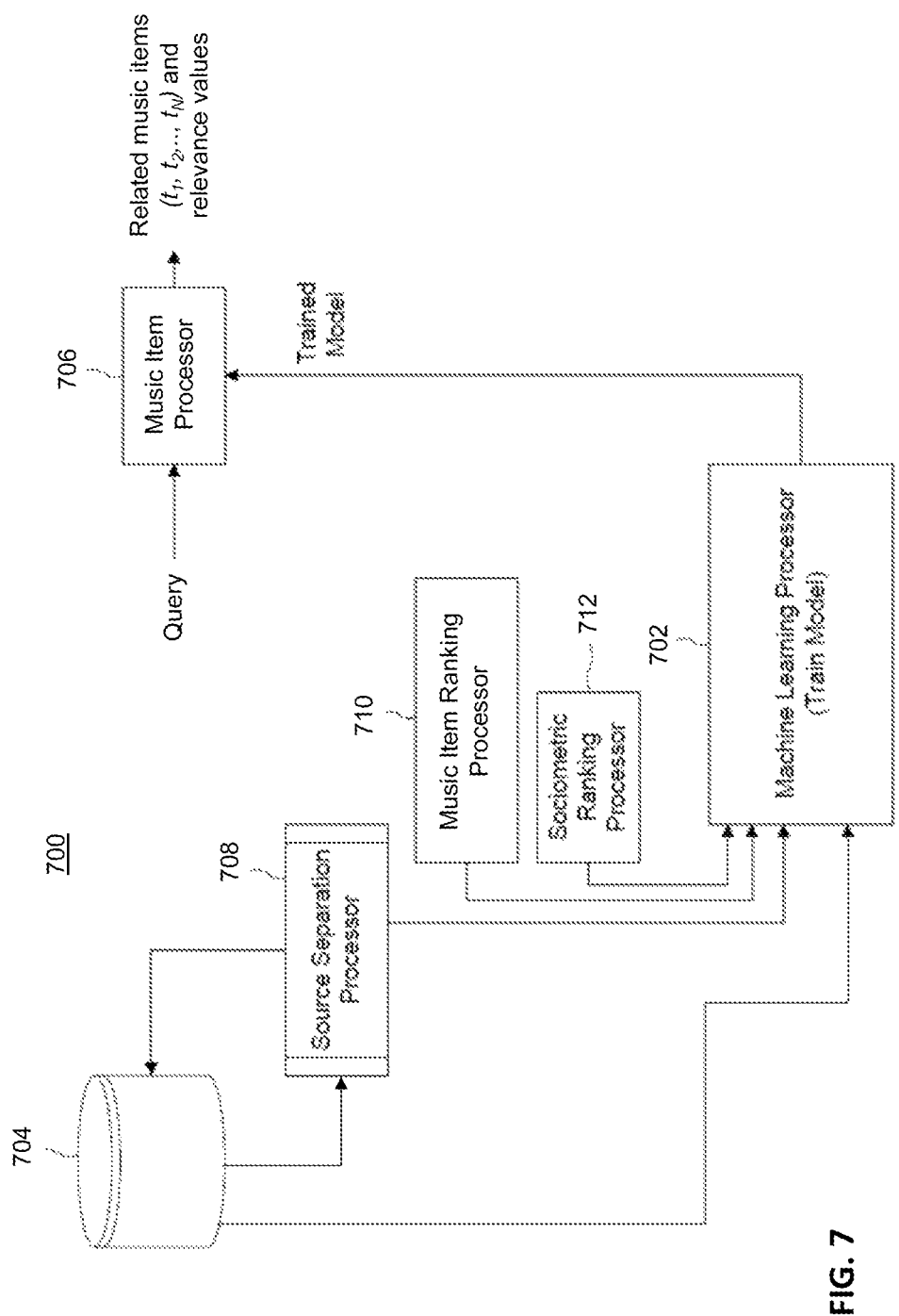
FIG. 7 illustrates a music item identification system utilizing machine-learning according to an example embodiment.

FIG. 7 illustrates a system 700 for identifying related music items according to an example embodiment of the present disclosure. The system comprises a machine-learning processor 702, a music item database 704 (such as the music item database 104 of FIG. 1), and a music item processor 706. The system 700 may optionally include a source separation processor 702, a music item ranking processor 708, and a sociometric ranking processor 710. The components of the system 700 may each be implemented as part of the relation processor 102 shown in FIG. 1.

The machine-learning processor 702 is fed music item data from the music item database 704. The machine-learning processor 702 trains a model, for example the model 200 shown in FIG. 2, based on the input data. Once the model is trained, it is provided to the music item processor 706, which uses the trained model to map the music items in the music item database into one or more subspaces. As discussed above, an input representation is determined for each of the music items in the music item database 704, which is in turn mapped into a vector space. The vectors in the vector space are mapped into a number of subspaces corresponding to a number of characteristics of the music items that are to be modelled. In this way, each music item in the music item database 704 can be represented in each of the subspaces. Once the items in the music item database 704 have been mapped to the subspaces, they can be referred to as target music items.

The music item processor 706 can then identify target music items based on a query music item, as will be explained in more detail in relation to FIG. 8. The music item processor 706 may receive a query item and map that item into the subspaces using the model trained by the machine-learning processor 702. The music item processor 706 may then compare the representation of the query to representations of the target music items in each subspace, and output one or more target music items $(t_1, t_2, \ldots, t_N)$ from music item database 704 that are related to the query. The music item processor 706 may also output a relevance value or ranking for target each music item $(t_1, t_2, \ldots, t_N)$ describing its degree of relation to the query for each relation type that is modelled.

As discussed above, the music item database 704 can be built or populated in different ways. In one embodiment, the source separation processor 708 performs source separation on songs in the song database 112 (shown in FIG. 1). Particularly, the source separation processor 708 separates the individual stems from a song in song that, when mixed, form the song. In another example embodiment, music items need not come from a source separation process. For example, music stems may be derived from existing multi-track recordings or retrieved from other sources.

In some embodiments, machine-learning processor 702 also receives ranked music items. The ranked items can be determined by a music item ranking processor 710 that is arranged to collect music items that have been used and ranked. The music can be collected and ranked according to a suitable music item ranking process known in the art. In some embodiments, the machine-learning processor 702 also receives music item sociometric rankings (e.g., a measure of the sociometric ranking values of a music item). Quantitative sociometric values corresponding to a song can be calculated by a music item sociometric ranking processor 712.

Figure 8:
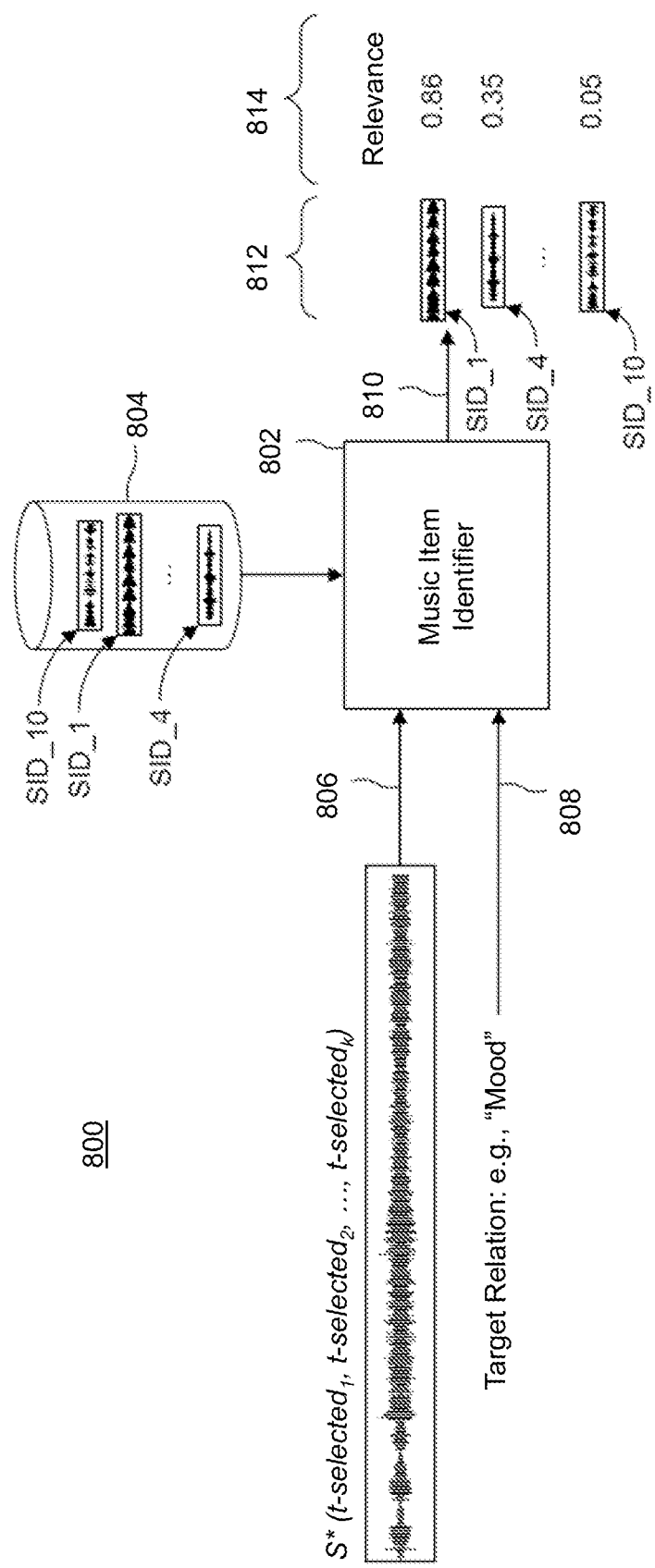
FIG. 8 illustrates an example music item identification system in accordance with an embodiment.

FIG. 8 illustrates an example of a music item identification system processing a query, in accordance with an embodiment of the present disclosure. As shown in FIG. 8, music item identification system 800 includes a music item identifier 802 and a music item database 804. The music item identifier 802 may be implemented as part of the music item processor 706 shown in FIG. 7. The music item database 804 may be, for example, the music item database 104 of FIG. 1 or the music item database 704 of FIG. 7.

As discussed above, target music items can be identified based on a query. The music item identifier 802 receives a query music item 806. The music item identifier 802 also receives a target relation input 808. The query music item 806 may be any suitable sort of music item, such as a symbolic item, and audio item, a submix, a track, a partially composed song, etc. In the example of FIG. 8, the query music item 806 is a submix S* having a predetermined number of pre-selected music tracks (t-selected$_1$, t-selected$_2$, . . . , t-selected$_k$). The target relation input 808 identifies specified relation or characteristic for which related music items are desired. In the example of FIG. 8, the target relation is mood. Whilst the target relation is mood in the example of FIG. 8, in some embodiments, multiple relations can be taken into account by increasing the number of characteristics in the target relation input 808.

Therefore, the query input by the user equates to a request for target music items having a similar mood to the submix S*. Using the trained model, the music item identifier 802 maps a representation of the submix S* a vector space, and then maps the representation into the subspace corresponding to the mood characteristic. The music item identifier 802 then compares the representation of the submix S* to representations of the target music items in the mood subspace, and outputs one or more music items which identify items from the music item database 804 that have a similar mood to the submix S*. This can be achieved by applying one or more nearest neighbour algorithms known in the art, which identify the target music item representations having the smallest distance to the query item representation in the mood subspace.

In an example embodiment, the output 810 from the music item identifier 802 is in the form of an ordered list of music item identifications 812 of music items. In an example embodiment the ordered pair of music item identifications 812 includes a music item identifier (e.g., SID_1, SID_4, . . . , SID_10) and at least one corresponding relevance value 814 (e.g., from 0-1) corresponding to a degree of relation between the submix S* and the respective target music item. A relevance value may then be output for each desired characteristic specified in the target relation input 808. The output music items may be any suitable sort of music item, for example symbolic, audio, tracks, submixes etc.

In an example embodiment, a relevance value for a given relation is obtained by first computing the distance (D) between a vector of the query music item 806 and a vector of each of the music items in the music item database 804 in a given subspace. Alternatively, a relevance value is obtained by first computing the distance (D) in the relevant subspace, and normalizing the distance as L=1−D/max_distance, where max_distance corresponds to a maximum possible distance in a given subspace (e.g., an N dimensional hypercube or sphere) using a given distance metric (e.g. Euclidean distance).

In some embodiments, the output music items can be filtered based on a given characteristic. For example, if the query contains one or more query music items 806 that do not contain any vocals (e.g., an input submix containing audio tracks such as drums, guitars, etc.), the query can include a parameter that only music items including vocals are output. If the target relation is mood, then the music identifier 802 will output music items including vocals having a similar mood to the query music item 806. This can be achieved by filtering results after the output music items have been provided, or by including a target class input that identifies a desired class (e.g., vocals) as part of the query.

A practical application of embodiments described herein include identifying music items for the purpose of assembling them in a song. The assembled plurality of music items can result in media content that can be played via a playback device. In some embodiments, the media content is in the form of a media content item in the form of a file that can be streamed, saved, mixed with other media content items, and the like.

Figure 9:
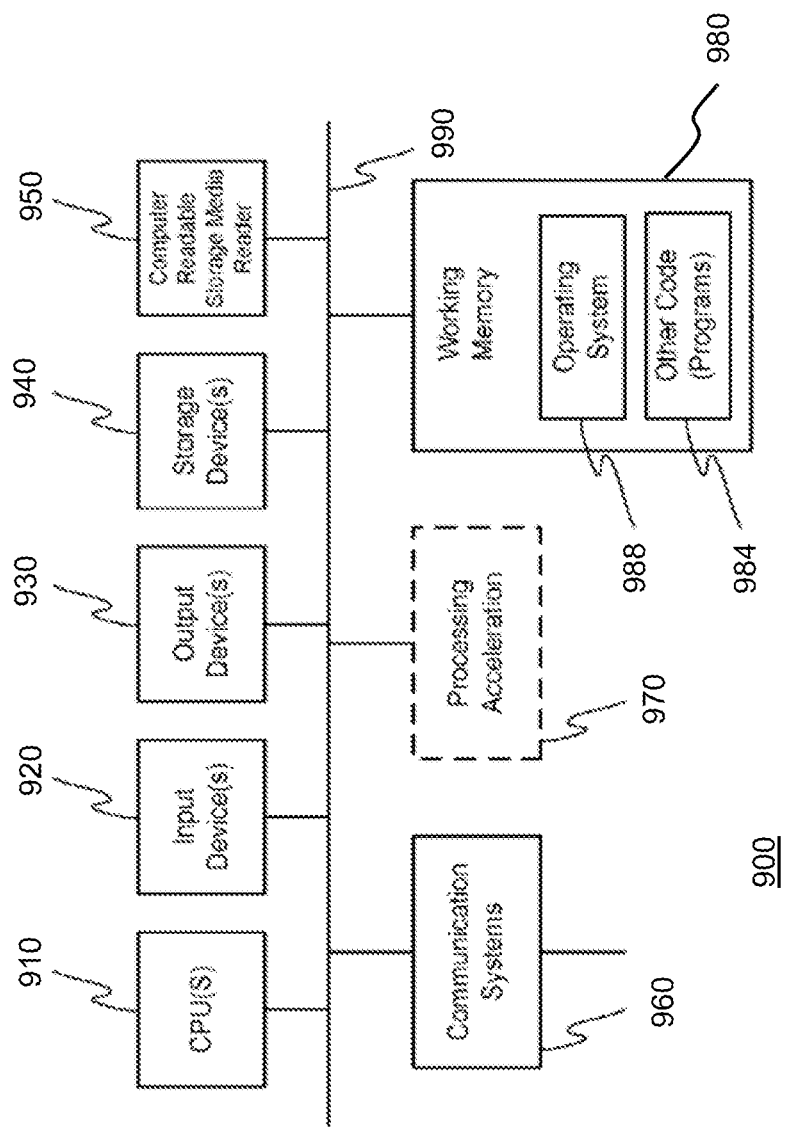
FIG. 9 is a block diagram illustrating an exemplary computer system in which embodiments of the present disclosure may be implemented.

FIG. 9 is a block diagram illustrating an exemplary computer system 900 in which embodiments of the present disclosure may be implemented. This example illustrates a computer system 900 such as may be used, in whole, in part, or with various modifications, to provide the functions of the disclosed system. For example, various functions may be controlled by the computer system 900, including, merely by way of example, generating, determining, identifying. receiving, mapping, projecting, etc.

The computer system 900 is shown comprising hardware elements that may be electrically coupled via a bus 990. The hardware elements may include one or more central processing units 910, one or more input devices 920 (e.g., a mouse, a keyboard, etc.), and one or more output devices 930 (e.g., a display device, a printer, etc.). The computer system 900 may also include one or more storage devices 940. By way of example, the storage devices 940 may be disk drives, optical storage devices, solid-state storage device such as a random-access memory ("RAM") and/or a read-only memory ("ROM"), which can be programmable, flash-updateable and/or the like.

The computer system 900 may additionally include a computer-readable storage media reader 950, a communications system 960 (e.g., a modem, a network card (wireless or wired), an infra-red communication device, Bluetooth™ device, cellular communication device, etc.), and a working memory 980, which may include RAM and ROM devices as described above. In some embodiments, the computer system 900 may also include a processing acceleration unit 970, which can include a digital signal processor, a special-purpose processor and/or the like.

The computer-readable storage media reader 950 can further be connected to a computer-readable storage medium, together (and, optionally, in combination with the storage devices 940) comprehensively representing remote, local, fixed, and/or removable storage devices plus storage media for temporarily and/or more permanently containing computer-readable information. The communications system 960 may permit data to be exchanged with a network, system, computer and/or other component described above.

The computer system 900 may also comprise software elements, shown as being currently located within the working memory 980, including an operating system 988 and/or other code 984. It should be appreciated that alternative embodiments of a computer system 900 may have numerous variations from that described above. For example, customised hardware might also be used and/or particular elements might be implemented in hardware, software (including portable software, such as applets), or both. Furthermore, connection to other computing devices such as network input/output and data acquisition devices may also occur.

Software of the computer system 900 may include code 984 for implementing any or all of the function of the various elements of the architecture as described herein. For example, software, stored on and/or executed by a computer system such as the system 900, can provide the functions of the disclosed system. Methods implementable by software on some of these components have been discussed above in more detail.

Embodiments of the disclosure have now been described in detail for the purposes of clarity and understanding. However, it will be appreciated that certain changes and modifications may be practiced within the scope of the appended claims. While various example embodiments have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. A method of identifying related tracks for song assembly, the method comprising:
determining a first input representation for a symbolic representation of a first musical track stored in a database of musical tracks;
mapping the first input representation to a particular subspace derived from a vector space using a first model, wherein the particular subspace models a particular characteristic;

determining a second input representation for music data representing a second musical track stored in the database of musical tracks;

mapping the second input representation to the particular subspace using a second model;

determining a distance between the mapping of the first input representation in the particular subspace and the mapping of the second input representation in the particular subspace, wherein the distance represents a degree of relation between the first input representation and the second input representation with respect to the particular characteristic; and identifying, based on the degree of relation, the first musical track and the second musical track as candidate musical tracks for song assembly.

2. The method of claim 1, wherein the first model comprises a first encoder and a first set of one or more mapping functions, wherein the second model comprises a second encoder and a second set of one or more mapping functions, wherein:

the first encoder is configured to map the first input representation to the vector space;

the second encoder is configured to map the second input representation to the vector space;

the first set of mapping functions is configured to map the first input representation from the vector space to the particular subspace; and the second set of mapping functions is configured to map the second input representation from the vector space to the particular subspace.

3. The method of claim 2, wherein the first encoder comprises a first neural network, and wherein the second encoder comprises a second neural network.

4. The method of claim 1, further comprising storing a musical track use record in the database of musical tracks, wherein the musical track use record indicates:

whether the first musical track has been previously retrieved from the database of musical tracks to create a song; and whether the second musical track has been previously retrieved from the database of musical tracks to create a song.

5. The method of claim 2, wherein the first set of mapping functions comprises at least one neural network, and wherein the second set of mapping functions comprises at least one neural network.

6. The method of claim 1, wherein the music data is an audio representation of the second musical track.

7. The method of claim 1, wherein the music data is a symbolic representation of the second musical track.

8. The method of claim 1, wherein the first model and the second model are different.

9. The method of claim 1, wherein the first model and the second model are the same.

10. The method of claim 1, wherein the particular characteristic comprise a genre, a rhythm, a mood, or a sound.

11. The method of claim 1, wherein the symbolic representation of the first musical track is a MIDI file, a MusicXML file, a list of events, or a piano-roll representation.

12. The method of claim 1, wherein a musical track is at least part of a musical composition.

13. The method of claim 1, wherein a musical track is part of a sub-mix comprising a number of musical tracks.

14. The method of claim 1, wherein a musical track represents an instrumental or vocal part of a musical composition.

15. The method of claim 12, wherein a larger distance between t the mapping of the first input representation in the particular subspace and the mapping of the second input representation in the particular subspace represents a lower degree of relation between the first input representation and the second input representation with respect to the particular characteristic.

16. The method of claim 1, wherein a smaller distance between the mapping of the first input representation in the particular subspace and the mapping of the second input representation in the particular subspace represents a higher degree of relation between the first input representation and the second input representation with respect to the particular characteristic.

17. A non-transitory computer-readable medium having instructions stored thereon that, when executed by a computing device, cause the computing device to perform operations comprising:

determining a first input representation for a symbolic representation of a first musical track stored in a database of musical tracks;

mapping the first input representation to a particular subspace derived from a vector space using a first model, wherein the particular subspace models a particular characteristic;

determining a second input representation for music data representing a second musical track stored in the database of musical tracks;

mapping the second input representation to the particular subspace using a second model;

determining a distance between the mapping of the first input representation in the particular subspace and the mapping of the second input representation in the particular subspace, wherein the distance represents a degree of relation between the first input representation and the second input representation with respect to the particular characteristic; and identifying, based on the degree of relation, the first musical track and the second musical track as candidate musical tracks for song assembly.

18. The non-transitory computer-readable medium of claim 17, wherein the operations further comprise storing a musical track use record in the database of musical tracks, wherein the musical track use record indicates:

whether the first musical track has been previously retrieved from the database of musical tracks to create a song; and whether the second musical track has been previously retrieved from the database of musical tracks to create a song.

19. A system comprising:

a memory; and one or more processors coupled to the memory, the one or more processor configured to:

determine a first input representation for a symbolic representation of a first musical track stored in a database of musical tracks;

map the first input representation to a particular subspace derived from a vector space using a first model, wherein the particular subspace models a particular characteristic;

determine a second input representation for music data representing a second musical track stored in the database of musical tracks;

map the second input representation to the particular subspace using a second model;

determine a distance between the mapping of the first input representation in the particular subspace and the mapping of the second input representation in the particular subspace, wherein the distance represents a degree of relation between the first input representation and the second input representation with respect to the particular characteristic; and identify, based on the degree of relation, the first musical track and the second musical track as candidate musical tracks for song assembly.

20. The system of claim 19, wherein the one or more processors are further configured to store a musical track use record in the database of musical tracks, wherein the musical track use record indicates:

whether the first musical track has been previously retrieved from the database of musical tracks to create a song; and whether the second musical track has been previously retrieved from the database of musical tracks to create a song.

* * * * *